(12) United States Patent
Fu et al.

(10) Patent No.: US 11,240,570 B1
(45) Date of Patent: Feb. 1, 2022

(54) OBJECT-BASED VIDEO LOADING

(71) Applicant: International Business Machines Corporation, Armonk, NY (US)

(72) Inventors: Lu Fu, Ningbo (CN); Yin Xia, Beijing (CN); Po Ya Chuang, Xizhi (TW); Wei-Te Chiang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/065,547

(22) Filed: Oct. 8, 2020

(51) Int. Cl.
| | |
|---|---|
| *H04N 21/845* | (2011.01) |
| *H04N 7/01* | (2006.01) |
| *H04N 21/6587* | (2011.01) |
| *G06K 9/00* | (2006.01) |

(52) U.S. Cl.
CPC ....... *H04N 21/845* (2013.01); *G06K 9/00718* (2013.01); *G06K 9/00765* (2013.01); *H04N 7/0117* (2013.01); *H04N 21/6587* (2013.01)

(58) Field of Classification Search
CPC ............... H04N 21/845; H04N 7/6587; H04N 21/6587; G06K 9/00718; G06K 9/00765
See application file for complete search history.

(56) References Cited

U.S. PATENT DOCUMENTS

| | | | | |
|---|---|---|---|---|
| 6,118,456 | A * | 9/2000 | Cooper | G06T 15/40 345/619 |
| 6,233,356 | B1 * | 5/2001 | Haskell | H04N 21/23412 382/243 |
| 6,496,607 | B1 * | 12/2002 | Krishnamurthy | H04N 19/46 375/E7.082 |
| 6,665,423 | B1 | 12/2003 | Mehrotra et al. | |
| 6,968,006 | B1 * | 11/2005 | Puri | G06T 9/001 375/240.08 |
| 7,092,548 | B2 | 8/2006 | Laumeyer et al. | |
| 7,650,058 | B1 * | 1/2010 | Garoutte | G08B 13/19667 386/326 |
| 8,559,720 | B2 | 10/2013 | Fang et al. | |
| 10,895,908 | B2 * | 1/2021 | Nijs | G06F 3/013 |
| 2002/0141650 | A1 * | 10/2002 | Keeney | H04N 19/162 382/239 |

(Continued)

FOREIGN PATENT DOCUMENTS

EP 1920570 A2 5/2008

OTHER PUBLICATIONS

Lee et al., "Key-Segments for Video Object Segmentation", Proceedings of the 2011 International Conference on Computer Vision, Barcelona, Spain, Nov. 6-13, 2011 8 pages, <https://ieeexplore.ieee.org/abstract/document/6126471>.

(Continued)

*Primary Examiner* — John R Schnurr
(74) *Attorney, Agent, or Firm* — Edward J. Wixted, III

(57) ABSTRACT

In an approach, a processor determines respective resolution levels for a plurality of objects, presented in a video segment to be rendered, based on a relationship between a primary object and at least one remaining object of the plurality of objects. A processors, determines, from the video segment, a plurality of object-based video elements at the determined respective resolution levels, each of the plurality of object-based video elements corresponding to one of the plurality of objects. A processor causes the plurality of object-based video elements to be delivered for rendering the video segment.

18 Claims, 7 Drawing Sheets

(56) References Cited

U.S. PATENT DOCUMENTS

| | | | |
|---|---|---|---|
| 2005/0091691 A1* | 4/2005 | Maruya | H04N 21/4333 |
| | | | 725/88 |
| 2005/0097615 A1 | 5/2005 | Moradi et al. | |
| 2009/0278937 A1 | 11/2009 | Botchen et al. | |
| 2009/0316795 A1* | 12/2009 | Chui | H04N 21/440263 |
| | | | 375/240.25 |
| 2015/0254806 A1* | 9/2015 | Circlaeys | H04N 21/238 |
| | | | 345/428 |
| 2019/0069000 A1* | 2/2019 | Hou | H04N 21/816 |
| 2020/0175751 A1* | 6/2020 | Connor | G06F 3/013 |
| 2020/0413157 A1* | 12/2020 | Rothschild | H04N 21/21805 |
| 2021/0112292 A1* | 4/2021 | Sivaramalingam | H04N 21/845 |

OTHER PUBLICATIONS

Lin et al., "Automatic Video Scene Extraction by Shot Grouping", Proceedings 15th International Conference on Pattern Recognition. ICPR-2000, Sep. 3-7, 2000, Barcelona, Spain, 4 pages, < https://ieeexplore.ieee.org/abstract/document/902860>.

Sav et al., "Interactive Experiments in Object-Based Retrieval", Proceedings of the 5th International Conference on mage and Video Retrieval CIVR 2006: Image and Video Retrieval, Tempe, AZ, Jul. 13-15, 2006, pp. 380-390, <https://link.springer.eom/chapter/10.1007/11788034_39>.

* cited by examiner

US 11,240,570 B1

OBJECT-BASED VIDEO LOADING

BACKGROUND

The present disclosure generally relates to multimedia processing techniques and more particularly, to object-based video loading.

Conventionally, a video is stored in units of frames in a video storage system. If a user is watching the video online in a playback mode such as a "high-definition" (HD) mode, a video player used by the user may load each frame at a quality level of HD and then render the video to the user frame by frame.

SUMMARY

Aspects of an embodiment of the present invention disclose a method, computer program product, and computer system. A processor determines respective resolution levels for a plurality of objects, presented in a video segment to be rendered, based on a relationship between a primary object and at least one remaining object of the plurality of objects. A processors, determines, from the video segment, a plurality of object-based video elements at the determined respective resolution levels, each of the plurality of object-based video elements corresponding to one of the plurality of objects. A processor causes the plurality of object-based video elements to be delivered for rendering the video segment.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
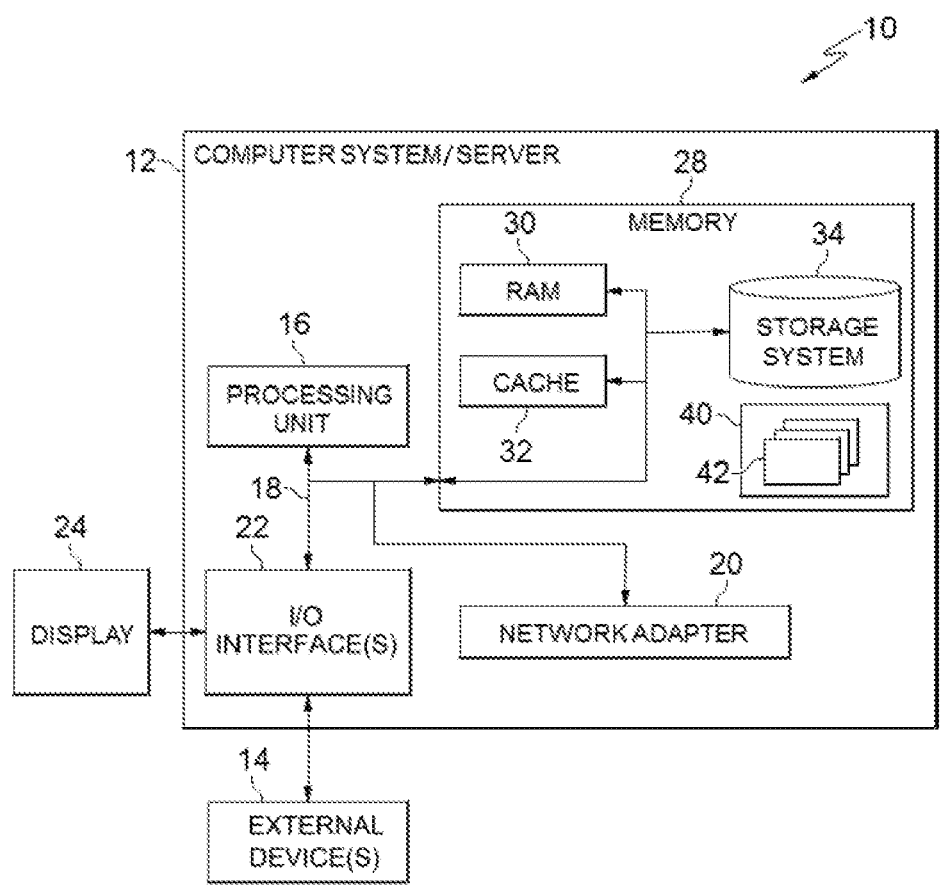
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
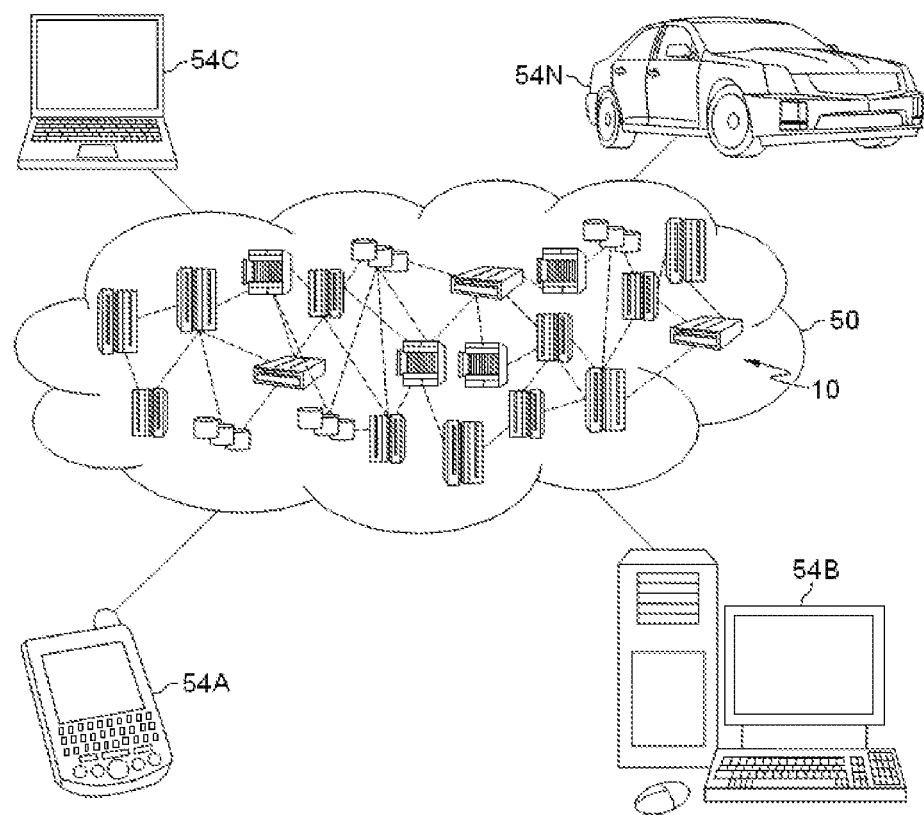
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
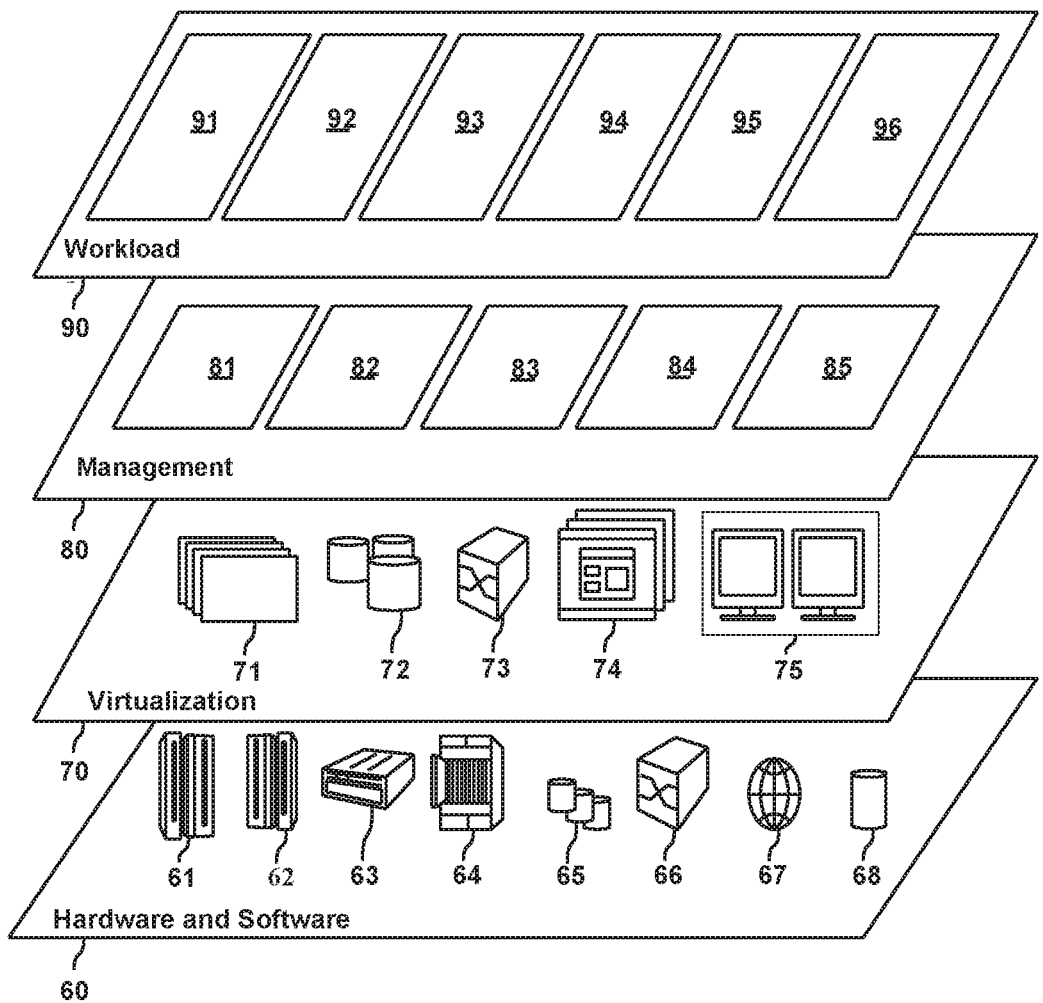
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object-based video loading 96. The functionalities of object-based video loading 96 will be described in the following embodiment of the present disclosure.

As known, video loading from content providers to client devices is restricted by network bandwidth capacity. Although the network bandwidth is increased currently, the video quality is upgraded too at the same time. Thus, users are still experiencing stuttering and lagging issues when viewing video online. If the video playback is blocked due to the network bandwidth limitations, the users have to endure a long wait before a sufficient amount of video content is loaded, which distracts the users and leads to bad user experience. Therefore, there is a need to improve the video loading process to ensure smooth video playback.

According to example embodiments of the present disclosure, there is proposed a solution for object-based video loading. In this solution, video content is dynamically loaded for rendering in units of objects. More specifically, among objects presented in a video segment to be rendered, a primary object is determined. Resolution levels for the objects are determined based on relationship analysis between the primary object and one or more remaining objects of the identified objects. For example, the primary object may have a relatively higher resolution level while the one or more remaining objects may have relatively lower resolution levels depending on their relationship with the primary object. The video segment is transformed into object-based video elements at the determined resolution levels, each video element corresponding to one of the identified objects.

The object-based video elements may be stored and can be delivered for rendering the video segment. As such, the video segment is stored and loaded in units of objects instead of frames according to the respective resolution levels. The object-based granularity can provide more possibilities of video quality combinations to adapt to the network bandwidth available for delivery of video content, thereby achieving optimized video playback fluency and improving user experience for viewing videos.

Other advantages of the present disclosure will be described with reference to the example embodiments and the accompanying drawings below.

Figure 4:
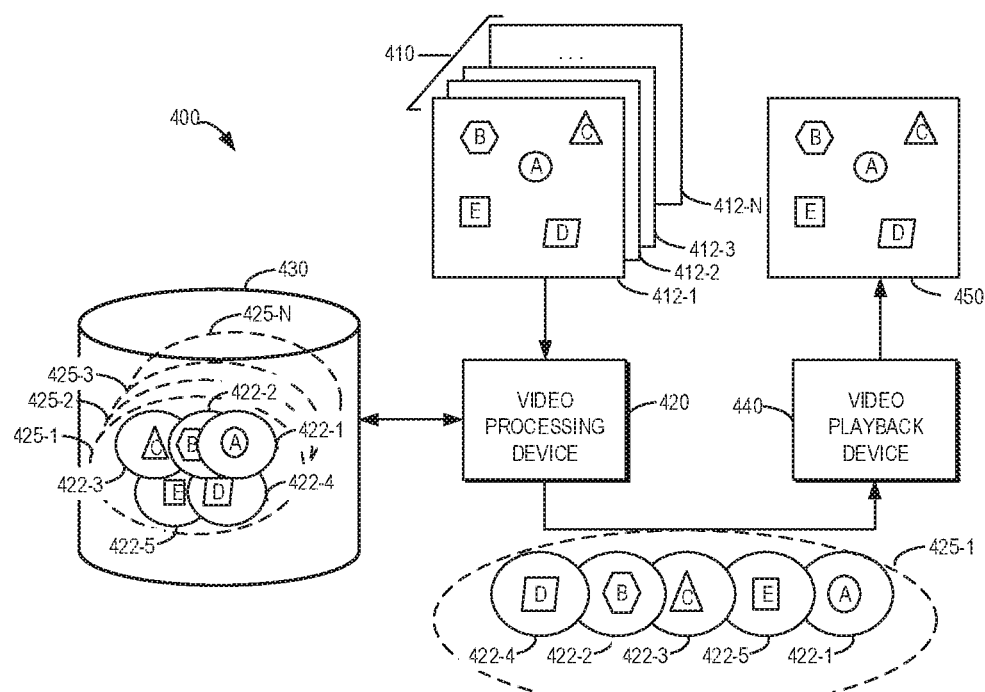
FIG. 4 depicts a block diagram of a system for object-based video loading and playback according to some embodiments of the present disclosure.

Reference is now made to FIG. 4, which illustrates a block diagram of a system 400 for object-based video loading and playback according to some embodiments of the present disclosure. The system 400 includes a video processing device 420 and a video playback device 440. The video processing device 420 is configured to process and provide video content to be played by the video playback device 440. The video content may be loaded from the video processing device 420 to the video playback device 440 via a wireless and/or wired network(s), such as the Internet. In some embodiments, the video content may be loaded in a streaming fashion to enable online viewing of the video content at the video playback device 440.

The video processing device 420 may be implemented at a content provider side while the video playback device may be implemented at a client side that consumes content. In some embodiments, the video processing device 420 and/or the video playback device 440 may be implemented by computer system/server 12 of FIG. 1.

In embodiments of the present disclosure, video content is processed to be loaded for rendering in units of objects presented in the video content. The video processing device 420 is configured to perform the object-based loading according to the embodiments of the present disclosure. It is assumed that a video 410 or a segment of the video 410 is to be loaded to the video playback device 440 for rendering. The video 410 refers to data representing visual images recorded over a period of time. Examples of the video 410 may include a video file, a video stream, a video game, Augmented Reality (AR) video contents, and Virtual Reality (VR) video contents, and/or other types of vide media. The video 410 may also be referred to as video contents, video information, a video sequence, or the like.

The video 410 may be formatted to include a sequence of frames 412-1, 412-2, 412-3, . . . , 412-N, where N is an integer larger than one. For ease of discussion, the frames 412-1, 412-2, 412-3, . . . , 412-N are collectively or individually referred to as frames 412. Typically, the frames 412 of the video 410 are recorded at regular intervals. Each frame 412 may be composed of a number of pixels and is corresponding to a visual image which can be viewed. As used herein, a frame may also be referred to as a video frame or an image frame.

The video processing device 420 identifies a plurality of objects from a video segment of the video 410. The video segment is a processing segment of the video 410 for object-based loading and is to be rendered at the video playback device 440. The video segment may be a part or all of the video 410 and may include at least one frame 412 of the video 410.

In the cases where a video segment is determined to be a part of the video 410, the video processing device 420 may perform video segmentation to divide the video 410 into a plurality of video segments to be processed respectively. Each video segment includes at least one of the frames 412 of the video 410, for example, a number of continuous frames 412.

Figure 5:
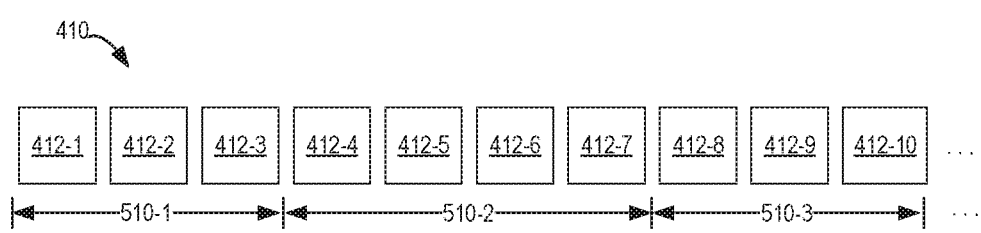
FIG. 5 depicts an example of video segmentation according to some embodiments of the present disclosure.

FIG. 5 shows an example of segmentation of the video 410. As shown, the video 410 is divided into video segments 510-1, 510-2, 510-3, . . . . , and so on (collectively or individually referred to as video segments 510 for ease of discussion), each including several frames 412 of the video 410. Depending on the ways the video 410 is segmented, different video segments 510 may include the same or different numbers of frames 412. It would be appreciated that the example of FIG. 5 is provided for purpose of illustration only. The video 410 may include more or less frames 412 as shown and may be segmented in other ways.

In some embodiments, the number of frames included in the respective video segments 510 may be preconfigured. In some example embodiments, the video segmentation may be performed according to shot boundary detection and/or scene boundary detection techniques.

More specifically, according to the shot boundary detection, the video processing device 420 may detect one or more shots included in the video 410 by determining at least one shot boundary. As used herein, a "shot" in a video refers to a sequence of frames that was continuously recorded from the same camera (or recorded at multiple times and reconstructed such that the multiple recordings appear as a continuous shot to the viewer). Any suitable shot boundary detection techniques, either currently available or to be developed in the future, may be applied to implement the shot detection. The video processing device 420 may segment the video 410 into the one or more shots based on the detected shot boundary/boundaries, and then determine one or more video segments 510 to be one or more shots detected from the video 410, respectively.

Alternatively, or in addition, the video processing device 420 may perform the scene boundary detection on the video 410 to detect one or more scenes included in the video 410 by determining at least one scene boundary. As used herein, a "scene" in a video is defined as one or more consecutive shots that are semantically correlated or share the same semantics in terms of time, place, objects, actions, events, or the like. Any suitable shot boundary detection techniques, either currently available or to be developed in the future, may be applied to implement the scene detection. The video processing device 420 may segment the video 410 into one or more scenes based on the detected scene boundary/boundaries, and then determine one or more video segments 510 to be one or more scenes detected from the video 410, respectively.

In some embodiments, among all the video segments 510 divided from the video 410, one or more video segments 510 may be corresponding to respective shots while one or more other video segments 510 may be corresponding to respective scenes. Although the video segmentation based on shot boundary detection and scene boundary detection are described, the video 410 may be divided according to another segmentation criteria.

The video processing device 420 may identify objects for each of the divided video segment(s) 510 of the video 410. The objects identified from a video segment 510 may include any visible objects presented in the frame(s) of the video segment 510, including, but not limited to, person, vehicle, tree, building, a background of a frame, and any moving and/or static objects. As depicted in FIG. 4, the frame 412-1 may present different objects represented by "A," "B," "C," "D," "E," and so on. It would be appreciated that those objects are depicted for illustration only without suggesting any limitation.

Since a video segment 510 may include one or more frames 412, to identify the objects therefrom, the video processing device 420 may perform object recognition on each of the frame(s) in the video segment 510. Any suitable object recognition technologies, either currently available or to be developed in the future, can be employed by the video processing device 420. The scope of the present disclosure is not limited in this regard.

Each frame 412 may include one or more objects. In some examples, the object recognition may be performed based on image processing performed on the frames 412, speech recognition performed on an audio track associated with the video segment 510, text analysis performed on caption information associated with the video segment 510, and/or any other suitable object recognition or object tracking methods.

Figure 6:
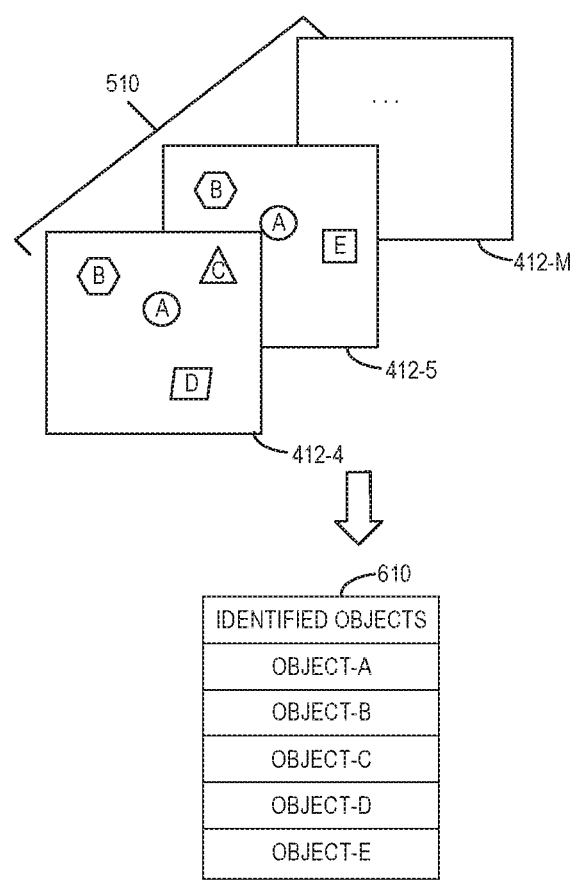
FIG. 6 depicts an example of object recognition from a video segment and associated assistance information according to some embodiments of the present disclosure.

As shown in FIG. 6, for a video segment 510 including frames, such as frames 412-4, 412-5, . . . , 412-M, the video processing device 420 may recognize objects represented by "A," "B," "C," "D" from the frame 412-4, objects represented by "A," "B," "E" from the frame 414-5, and other objects from the remaining frame(s) in the video segment. The video processing device 420 may generate a list 610 of objects for the video segment 510, which includes non-duplicated objects identified from this video segment. For any other video segments 510 in the video 410, the video processing device 420 may also determine respective lists of identified objects. It would be appreciated that the number and distribution of the objects in FIG. 6 are merely examples without suggesting any limitation to the scope of the present disclosure.

After the objects are identified for the video segment 510, the video processing device 420 determines respective resolution levels for the identified objects. In embodiments of the present disclosure, instead of loading a video segment at a same resolution level in units of frames, it is proposed to load the video segment in units of objects with various different resolution levels. To enable the loading of the video segment in units of objects, the video processing device 420 transforms the video segment 510 into a plurality of object-based video elements corresponding to the respective identified objects.

An object-based video element corresponding to one object is generated at a resolution level determined for this object. As such, the object-based video element(s) corresponding to a same object has a consistent video quality while the object-based video elements corresponding to different objects have different video qualities. A higher resolution level typically indicates a higher video quality. Accordingly, an object-based video element at a higher resolution level includes a larger amount of information as compared with an object-based video element at a lower resolution level. As a result, the total video amount to be loaded can be varied according to the resolution levels for the identified objects.

The determination of the resolution levels and the generation of the object-based video elements will be described in detail below.

In embodiments of the present disclosure, the resolution differentiation among objects is based on the observations that when users view a video, the focuses of the users (or viewer) are limited to and mainly placed on certain areas of the frames of the video. That is, the users may pay more attention to such areas or objects in the areas. It is beneficial to video playback fluency if some important objects in the video are loaded with relatively higher resolution levels while the other objects are loaded with relatively lower resolution levels. In view of the observations above, the video processing device 420 determines different resolution levels for different objects identified from the video segment 510. The resolution levels for the objects are determined based on a relationship between a primary object and the remaining (or non-primary) object(s) of the plurality of objects.

For a video segment 510, a primary object is an object of interest among the identified objects, which may be determined to have a highest probability of being the user's focus when the user views the video segment 510. Thus, the resolution level for this primary object may be determined to be a relatively higher resolution level than the resolution level(s) determined for the one or more non-primary objects. The selection of the primary object is first described and the determination of the respective resolutions of all the objects identified from the video segment 510 will be then described in detail in the following.

The primary object may be selected from the objects in the video segment 510 based on one or more of various factors. In some embodiments, the video processing device 420 may determine respective occurrence durations of the objects in the video segment 510 and select the primary object based on the occurrence durations. For example, the primary object may be determined to be an object having a relatively longer or longest occurrence duration. Alternatively, or in addition, the video processing device 420 may determine respective occurrence frequencies of the objects in the video segment 510 and select the primary object based on the occurrence frequencies. The primary object may be determined to the one having a relatively higher or highest occurrence frequency.

Alternatively, or in addition, the video processing device 420 may analyze a story line acted in the video segment 510 or the whole video 410, and/or a logical relationship between the objects in the video segment 510 or the whole video 410 through semantic analysis technologies. Any suitable semantic analysis technologies, either currently available or to be developed in the future, can be employed by the video processing device 420. The scope of the present disclosure is not limited in this regard.

The story line may indicate events, actions, and/or interactions between the objects in the video segment 510 or the video 410. In a video or video segment presenting a certain story, some of the objects may generally be corresponding to characters or roles in the story line. The logical relationship may indicate semantic correlations between those characters or roles. Through analysis of the story line and/or the logical relationship, the video processing device 420 may determine which object is more important to the story presented in the video segment 510 or of more interest to users viewing the video segment 510.

In some embodiments, the video processing device 420 may obtain assistance information associated with the respective objects for determining the occurrence durations, the occurrence frequencies, and/or the logical relationship for the objects in the video segment 510. The assistance information may include an audio track associated with the video segment 510, caption information associated with the video segment 510, one or more frames included in the video segment 510, and/or the like.

In some embodiments, the primary object may be determined by intelligently analyzing user customization. In particular, the video processing device 420 may determine a user focus or a user's sight focus on an object or an area presenting the object when the video segment 510 is viewed. The user may be the one that is currently viewing or requests to view the video 410. Information concerning the user's focus may be provided from the video playback device 440 for determining the user focus. The video processing device 420 may alternatively or additionally determine a user preference and determine which object may be of interest to the user based on the user preference. Information concerning the user preference may be collected from various sources and may be directly associated with the user viewing the video 410 or other users. The primary object may be the one having the user focus and/or the one that is determined to be preferred by the user.

Various factors for determining the primary object have been discussed above. It would be appreciated that the primary object for the video segment 510 may be based a single factor or a combination of two or more of the above factors. In other embodiments, the primary object may be determined in other manners. For example, the video processing device 120 may receive an explicit indication of the primary object specified by the user viewing the video segment 510.

In some embodiments, a same primary object may be determined for multiple video segments 510 or for the whole video 410. The video processing device 420 may select a primary object for each video segment 510 according to some embodiments described above. In some embodiments, two or more primary object candidates may be determined for a video segment 510, for example, through analyzing the occurrence durations, the occurrence frequencies, and/or the logical relationship. A primary object may be dynamically selected from the primary object candidates based on, for example, current user customization in reviewing the video segment 510 as different users may prefer different primary objects.

With the primary object determined, the resolution level(s) for one or more remaining (non-primary) objects may be determined based at least in part on their relationship(s) with the primary object. A relationship between a primary object and a further object indicates a correlation level between the two objects. As briefly mentioned above, the resolution level for the primary object may be determined to be a higher resolution level than those for other non-primary objects. In some embodiments, if a non-primary object is highly correlated to the primary object, the resolution level for this non-primary object may be determined to be more approximate to the resolution level for the primary object. The resolution level(s) for one or more remaining objects may be determined to be lower than the resolution level for the primary object.

The video processing device 420 may apply relationship analysis technologies on the video segment 510 to determine the relationships between any pair of objects identified from this video segment. A relationship between the primary object and a non-primary object may be indicated by a measure of a relationship strength between the objects. A larger measure of a relationship strength between the primary object and the non-primary object may indicate a higher level of correlation between the two objects. In some embodiments, a relationship between the primary object and the non-primary object may include a direct relationship and/or an indirect relationship therebetween. The measure of a relationship strength between the primary object and the non-primary object may be determined based on a measure of the direct relationship and/or a measure of the indirect relationship therebetween. As used herein, an indirect relationship indicates that an object is indirectly correlated to another object via one or more further objects.

In some embodiments, the video processing device 420 may determine a direct relationship between each pair of the objects in the video segment 510 and then determine an overall relationship between the primary object and each of the other objects based on the direct relationships. Specifically, in determining the direct relationship, the video processing device 420 may determine a respective measure of a direct relationship strength between each pair of the objects (including the primary and non-primary objects) in the video segment 510. The measure of the direct relationship strength between a pair of objects may be determined based various types of information related to the two objects.

In some embodiments, the measure of the direct relationship strength between a pair of objects may be determined based on: a distance between the two objects if the two objects are presented in a same frame, positions of the two objects within a frame or across frames, and/or a logical relationship between the objects. In some examples, if the two objects are positioned in a same frame and/or have a smaller distance within this frame, the video processing device 420 may determine that the two objects are highly correlated to each other and determine the measure to be a relatively larger value. If the positions of the two objects indicate that they are presented in two different frames with a large interval, the two objects may not be closely correlated to each other and thus the measure of the direct relationship strength may be a relatively smaller value. In some examples, if the logical relationship indicates that the two objects have a high semantic correlation in the story of the video segment 510, or the whole video 410, the measure of the direct relationship strength may also be determined to a relatively larger value.

In addition to the distance, the position, and the logical relationship, or as an alternative, there may be one or more other factors that influence the measure of the direct relationship strength between two objects. For each two of the objects in the video segment 510, the video processing device 420 may determine a corresponding measure of a direct relationship strength.

Figure 7A:
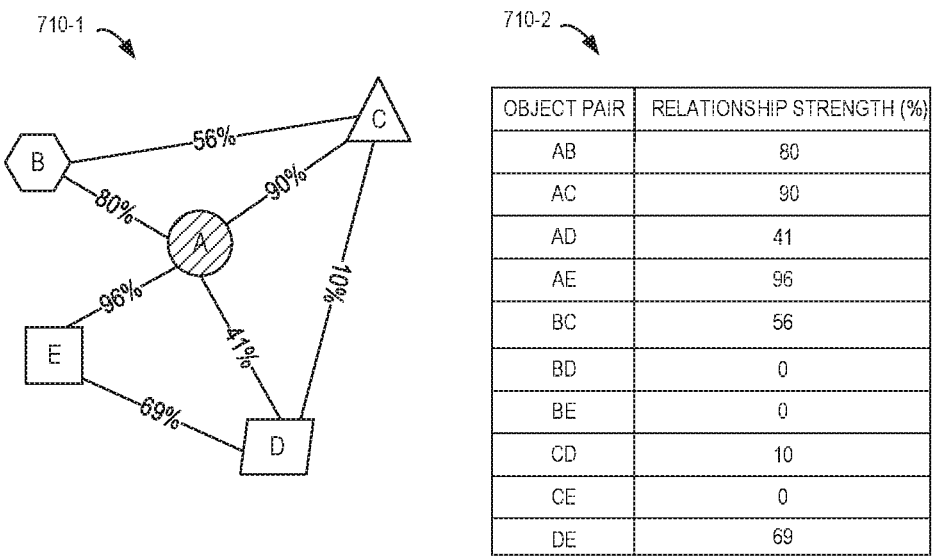
FIGS. 7A-7B depict examples of direct relationships between a primary object and remaining objects in a video segment according to some embodiments of the present disclosure.
Figure 7B:
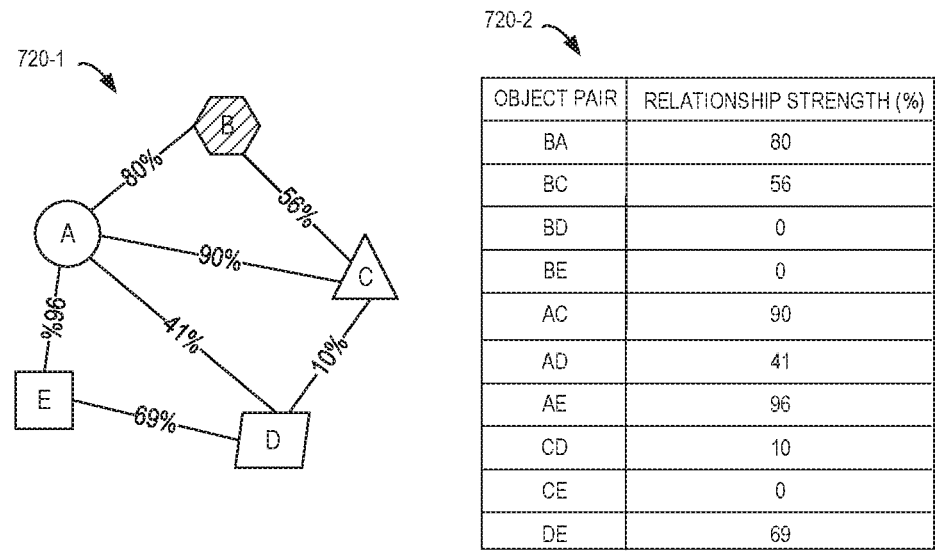

FIGS. 7A and 7B are some examples illustrating the direct relationships between two objects in the video segment 510 if different primary objects are selected. In the two figures, objects represented by "A," "B," "C," "D," "E" identified in FIG. 5 are still used as examples. A direct relationship strength is measured by a percentage value in a range from 0% to 100%. In an embodiment, an object may have a highest direct relationship with itself, measured by, for example, 100%. If two objects have no direct relationship, the measure of their direct relationship is 0%.

In the example of FIG. 7A, the primary object is object "A." A relationship representation 710-1 is illustrated to represent the direct relationships between two objects in a form of graph. Each object is represented as a node in the graph, and a connection between two nodes indicates their direct relationship. A measure of a direct relationship strength between two objects is marked on the connection. If two objects have no direct relationship, there is no direct connection connected between the corresponding nodes. As can be seen from the relationship representation 710-1, objects "B" and "E" has no direct relationship, and some other objects with no direct connections also have no direct relationship. The direct relationships between two objects may also be represented in a form of table, such as the relationship representation 720-1 shown in FIG. 7A which specifically lists measures of direct relationship strengths between respective pairs of objects "A," "B," "C," "D," "E".

In the example of FIG. 7B, the primary object is object "B." A relationship representation 720-1 in the form of graph and a relationship representation 720-2 in the form of table may be determined to represent the measures of the direct relationship strengths between objects "A," "B," "C," "D," "E".

With the measures of the direct relationship strengths between the objects determined, the video processing device 420 may determine a respective measure of a relationship strength between the primary object and each of the remaining object(s) based on the measures of the direct relationship strengths. In an embodiment, if only the direct relationships are considered, the respective measure of the relationship strength between the primary object and each of the remaining object(s) may be determined as the measures of the direct relationship strengths. For example, in the case that object "A" is the primary object, according to the direct relationships between two objects shown in the relationship representations 710-1 and/or 710-2 in FIG. 7A, a measure of a relationship between objects "A" and "B" is 80%, a measure of a relationship between objects "A" and "C" is 90%, and so on.

In some embodiments, an indirect relationship between the primary object and a remaining non-primary object may be alternatively, or additionally, considered in determining the measure of the relationship strength between these two objects. If the primary object is indirectly correlated to a non-primary object via one or more further objects, a measure of an indirect relationship strength may be determined based on measures of direct relationship strengths between various pairs of objects from the primary object to the non-primary object through the one or more further objects, for example, based on a product of the measures.

In the example of FIG. 7A, the primary object "A" may be indirectly correlated to object "E" via object "D." A measure of an indicate relationship strength between objects "A" and "E" may be determined based on a product of a measure of a direct relationship strength between objects "A" and "D" and a measure of a direct relationship strength between objects "D" and "E." The product may be calculated as, for example, 41%*69%=28.29%. The primary object "A" may be indirectly correlated to object "E" via other different objects, such as via objects "C" and "D." Such indirect relationship may or may not be considered in determining the measure of the relationship strength between objects "A" and "E."

In some embodiments, the measure of the relationship strength between the primary object and a non-primary object may be determined as a maximum measure among the measures of direct and indirect relationship strengths of the two objects. For example, the measure of the relationship strength between a primary object represented as "X" and an non-primary object represented as "Y" may be determined based on the following equation: Max [RS(XY), RS(XZ*ZY), RS(XZ*ZW*WY), . . . ], where Max ( ) represents selecting the maximum measure, RS(XY) represents a measure of a direct relationship strength between the two objects "X" and "Y", RS(XZ*ZY) represents a measure of an indirect relationship strength between the "X" and "Y" (via an object "Z"), and other elements in the equation may be interpreted in a similar way.

To better understand the measures of the relationship strengths between the primary object and the remaining objects in the video segment 510, Tables 1 and 2 list the results of the measures calculated for the examples in FIG. 7A and FIG. 7B, respectively.

TABLE 1

| Object | Calculation equation | Measure of relationship strength | Resolution level |
|---|---|---|---|
| A (primary) | Max[RS(AA)] = 100% | 100% | 100% |
| B | Max [RS(AB), RS(AC*CB)] = Max [80%, 56%] | 80% | 80% |
| C | Max [RS(AC), RS(AB*BC)] = Max [90%, 44.8%] | 90% | 90% |
| D | Max [RS(AD), RS(AE*ED), RS(AC*CD)] = Max [41%, 66.24%, 9%] | 66.24% | 66.24% |
| E | Max [RS(AE), RS(AD*DE)] = Max [96%, 28.29%] | 96% | 96% |

TABLE 2

| Object | Calculation equation | Measure of relationship strength | Resolution level |
|---|---|---|---|
| B (primary) | Max[RS(BB)] = 100% | 100% | 100% |
| A | Max [RS(BA), RS(BC*CA), RS(BC*CD*DA), RS (BC*CD*DE*DA)] = Max [80%, 50.4%, 1.84%, 2.96%] | 80% | 80% |

TABLE 2-continued

| Object | Calculation equation | Measure of relationship strength | Resolution level |
|---|---|---|---|
| C | Max [RS(BC), RS(BA*AC), RS(BA*AD*DC)] = Max [56%, 72%, 3.28%] | 72% | 72% |
| D | Max [RS(BD), RS (BA*AD), RS (BA*AE*ED), RS(BC*CD)] = Max [0%, 32.8%, 52.9%, 5.6%] | 52.9% | 52.9% |
| E | Max [RS(BA*AE), RS (BC*CD*DE)] = Max [76.8%, 3.86%] | 76.8% | 76.8% |

It is noted that in Tables 1 and 2, "RS(AA)" and "RS (BB)" indicate measures of direct relationship strengths of the two primary objects "A" and "B," respectively, which may be determined as a highest value represented as "100%." It would be appreciated the values and the relationship shown in FIGS. 7A and 7B as well as in Tables 1 and 2 are provided for purpose of illustration only without suggesting any limitation to the scope of the present disclosure. In some embodiments, as an alternative to selecting the maximum measure, the measure of the relationship strength between the primary object and another non-primary object may be determined in other ways based on the measures of their direct and indirect relationship strengths, for example, by calculating a sum or a weighted sum of the measures. The scope of the present disclosure is not limited in this regard.

With the measures of the relationship strengths determined, the video processing device 120 may assign a resolution level for the primary object and then determine the resolution level(s) for one or more remaining objects relative to the resolution level assigned for the primary object based on the determined measures.

In some embodiments, the resolution level for the primary object may be directly assigned with a highest resolution level as compared with all the other objects. The highest resolution level may be predefined or may be determined based on a playback mode of the video segment 510. In an embodiment, the primary object may have a resolution level corresponding to a playback mode of the video segment 510. For example, if the video segment 510 is to be played back in a HD mode by the video playback device 440, the resolution level for the primary object may be determined to be a level corresponding to the HD mode. In addition to the HD mode, the playback mode may be selected from a standard definition mode, a 720p mode, a 1080p mode, an ultra-high definition (UHD) mode, a 4K mode, and/or the like. Alternatively, or in addition, the resolution level for this primary object may be determined based on available network bandwidth for delivering video content to the video playback device 440. If the available network bandwidth is very low (lower than a threshold), a resolution level lower than the one corresponding to the current playback mode may be assigned to the primary object.

When the resolution level for the primary object is determined, the resolution level(s) for one or more remaining objects may be determined depending on their measures of the relationship strengths with the primary object. In the example shown in Table 1, the resolution level of the primary object "A" is represented as "100%," indicating the highest resolution matching the current playback mode, and the resolution of object "B" may be determined to be "80%" based on its measure of the relationship strength "80%." The resolution level "80%" for object "B" indicates that the resolution for object "B" is 20% lower than the resolution for object "A." The resolution levels for other non-primary objects may be determined likewise, and the results are also listed in the last column in Table 1. If the primary object is object "B" as in the example of FIG. 7B and Table 2, the resolution level for object "B" is the highest one while the resolution levels for other objects may be determined likewise.

Some embodiments where the resolution levels are determined based on the relationship between the objects have been described above. In some embodiments, the resolution levels determined for the one or more non-primary objects may be further determined based on the available network bandwidth for delivering video content to the video playback device 440. In an embodiment, if the available network bandwidth is relatively higher but is not high enough for transmitting the frames of the video segment 510 in a highest resolution level corresponding to the current playback mode, the resolution levels determined for the non-primary objects may be determined based on the measures of their relationship strengths with the primary object as described above. If the available network bandwidth is lower (for example, lower than a threshold), the resolution level(s) determined for one or more of the non-primary objects may be further reduced. For example, in the example shown in Table 1, the resolution of object "B" may be reduced from "80%" to be "70," the resolution level for object "C" may be reduced from "90%" to be "80," and so on.

In some embodiments, the video processing device 120 may select more than one primary object for the video segment 510. Two or more selected primary objects may be treated equally in determining the resolution levels. In other words, the video processing device 120 may determine a same resolution level for two or more primary objects selected for the video segment 510. For each one or more non-primary object in the video segment 510, the resolution level may be determined based on the respective relationships with the two or more primary objects. The overall measure of the relationship strength of each non-primary object and the two or more primary objects may be determined, for example, by determining an individual measure of a relationship strength between each of the two or more primary objects and the non-primary object and determining a combination (e.g., a weighted sum) of the two or more individual measures.

The determination of the resolution levels for the objects, including the primary object and the remaining objects in the video segment 510, has been described above. As briefly described above, the video processing device 420 generates, from the video segment 510, a plurality of object-based video elements at the determined resolution levels, each object-based video element corresponding to one of the identified objects. An object-based video element may include a part of video information related to the corresponding object in the video segment 510, used to render the visual representation of the corresponding object. The video information included in an object-based video element may include pixel information of the area presenting the object in a frame of the video segment 510, location information indicating the location of the object-based video element within the frame, and/or any other information needed for rendering the visual representation of the corresponding object.

In some embodiments, the video processing device 420 may divide each frame 412 of the video segment 510 into one or more object-based video elements corresponding to one or more objects included in that frame. Referring back to FIG. 4, as illustrated, the video processing device 420 may divide the frame 412-1 in the video 410 into object-based video elements 425-1, 425-2, 425-3, 425-4, 425-5 corresponding to objects "A," "B," "C," "D," "E" in this frame. A combination of those object-based video elements may collectively be used to render the frame 412-1. The resolution levels of the object-based video elements are different, and thus some areas of the frame may have relatively higher video quality while some other areas may have relative lower video quality. For each of other frames in the video segment 510, the video processing device 420 may generate the object-based video elements in a similar manner.

In some embodiments, instead of generating the object-based video elements per frame, the video processing device 420 may generate an object-based video element from two or more frames 412 of the video segment 510 if the corresponding object is continuously presented in those frames.

In some embodiments, the video processing device 420 may store the generated object-based video elements for each video segment 510 into a video storage system 430. In response to determining that the video segment 510 is to be rendered, the video processing device 420 causes the object-based video elements to be delivered to the video playback device 440. In some embodiments, the resolution levels for the objects presented in the video segment 510 and the object-based video elements may be determined in advance before the video segment 510 is determined to be rendered. In some embodiments, the video processing device 420 may implement the determination of the resolution levels and the object-based video elements online after determining that the video segment 510 is to be rendered.

The video processing device 420 may include a transmitter to implement the delivery of the object-based video elements. Alternatively, the video processing device 420 may instruct an external transmitter device to deliver the object-based video elements to the video playback device 440. The object-based video elements may be rendered by the video playback device 440 and presented to the viewer so that the video segment 510 can be viewed at the video playback device 440. Object-based video elements for all the video segments 510 in the video 410 may be similarly delivered to the video playback device 440.

As an example, for a frame 412-1 of the video segment 510, the video processing device 420 may transmit the object-based video elements 425-1, 425-2, 425-3, 425-4, 425-5 at respective resolution levels to the video playback device 440. The object-based video elements 425-1, 425-2, 425-3, 425-4, 425-5 may be played back to represent a frame 450 which is corresponding to a viewed version of the frame 412-1.

As compared with the transmission of the whole frame 412-1 with the highest resolution level matching with the current playback mode, the total amount of information to be transmitted corresponding to the object-based video elements 425-1, 425-2, 425-3, 425-4, 425-5 may be reduced, and thus can be completely loaded to the video playback device 440 at a faster speed. As a result, it is possible to avoid or mitigate the video stuttering and lagging issues even if the network bandwidth is limited, thereby providing a smooth and streaming video playback experience to the user.

In some embodiments, the video processing device 420 may determine a loading order of a plurality of object-based video elements in a frame, several frames, or all of the frames of the video segment 510 based on the resolution levels of the objects therein. In an embodiment, if an object has a relatively higher resolution level, the corresponding object-based video element may be ranked with a higher prioritization. The object-based video elements may be loaded to the video playback device 440 in the determined loading order.

With reference to the example in Table 1 and FIG. 4, the object-based video elements 425-1, 425-2, 425-3, 425-4, 425-5 corresponding to objects "A" to "E" (422-1 to 422-5) may be loaded in an order of "A" 422-1, "E" 422-5, "C" 422-3, "B" 422-2, and "D" 422-4, according to the resolution levels of those objects. As such, the object-based video elements with higher resolution levels, especially the primary object, may be loaded to the video playback device 440 with higher prioritizations.

In some embodiments, before the delivery, the object-based video elements may be encoded by applying any suitable video encoding scheme. In an embodiment, a video encoding scheme based on intra-frames (I-frames), forward predicted frames (P-frames), and bi-directional predicted frames (B-frames) may be applied. As compared with encoding the video in units of frames, in encoding the object-based video elements, object-based video elements representing a frame may be considered as a whole frame, or each object-based video element may be considered as a single frame.

In some embodiments, as the primary object for the video segment 510 may change due to different focuses or preferences of different users, to ensure immediate video element provision, the video processing device 420 may generate a plurality of candidate object-based video elements at different candidate resolution levels for each object in the video segment 510. The candidate object-based video elements for each object may be stored, for example, in the storage system 430 for use. Each of the different candidate resolution levels may be determined with respect to the case that one of the objects is selected as a primary object. For example, in the examples shown in Tables 1 and 2, for object "A," at least two candidate object-based video elements at a candidate resolution level of "100%" and a candidate resolution level of "80%" are generated and stored for dealing with different cases where object "A" is the primary object and object "B" is the primary object.

If the video segment 510 is to be delivered for rendering, the video processing device 420 may determine the resolution level for that object based on the current primary object according to some embodiments described above, and then select the object-based video element for the object from the previously-generated candidate object-based video elements.

In some embodiments, the delivery of the object-based video elements to the video playback device 440 may be determined based on the available network bandwidth for delivering. In an example shown in FIG. 8, if the available network bandwidth at a certain time point is extremely low, the video processing device 420 may deliver the object-based video elements at relatively lower resolution levels, including the object-based video element corresponding to the primary object "A." The object-based video elements may be rendered as a frame 810 at this time point. In the frame 810, all the object-based video elements have a same lower resolution level in this example. In another example, the object-based video elements in the frame 810 may have low but different resolution levels. The object-based video element corresponding to the primary object "A" may still have a resolution level lower than a resolution level corresponding to the current playback mode, and other object-based video elements corresponding to the non-primary objects "B" to "E" may have resolution levels lower than the resolution of the primary object "A".

At a later time point, if the available network bandwidth increases but is still not sufficient for transmitting high quality video at a desirable speed, the video processing device 420 may deliver object-based video elements at different resolution levels determined for objects "A" to "E" to be rendered as a frame 820 at this time point. The object-based video element corresponding to the primary object "A" may have the highest resolution level corresponding to the current playback mode. The object-based video elements corresponding to other objects may have lower resolution levels relative to the resolution level for the primary object "A." For example, the object-based video element corresponding to the object "B" may have a resolution level of "80%" relative to the resolution level "100%" for the primary object "A," as illustrated in Table 1 above.

At a further later time point, if the available network bandwidth keeps increasing and high quality video corresponding to the current playback mode can be loaded to the video playback device 440 at a desirable speed, the video processing device 420 may deliver object-based video elements at a resolution level matching with the current playback mode, such as the highest level for the primary object "A." The object-based video elements are rendered as a frame 830. In some examples, in such case of sufficient bandwidth, the video processing device 420 may decide to deliver the video 410 in units of frames although the object-based video elements at the same resolution level are also available.

Figure 8:
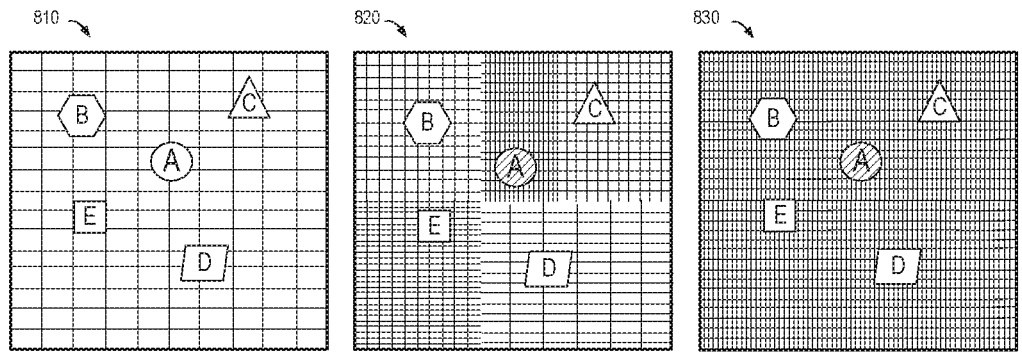
FIG. 8 depicts an example of video playback in units of objects according to some embodiments of the present disclosure.

Through the process discussed with reference to FIG. 8, the example solution in some embodiments of the present can enable dynamic object-based video loading according to the network bandwidth availability while maintaining video fluency to the user in viewing the video.

Figure 9:
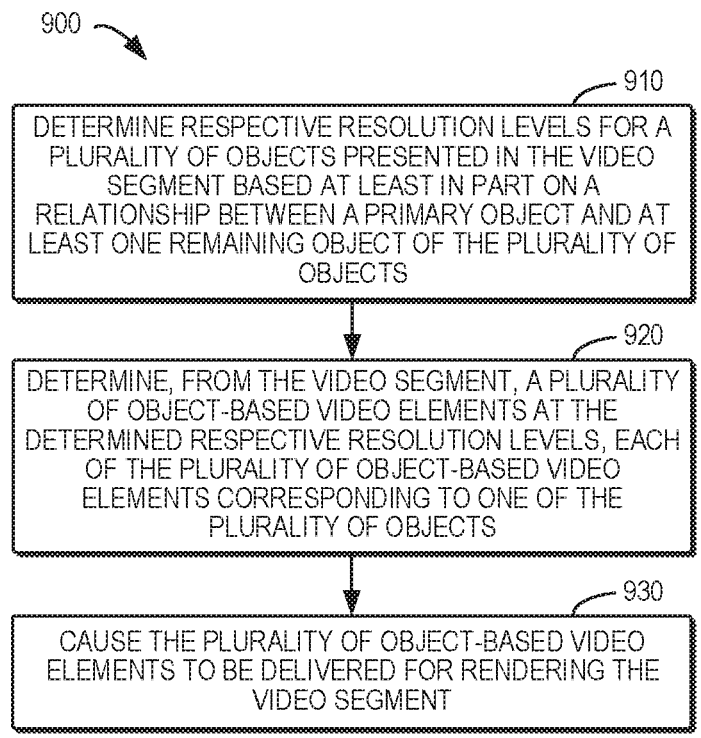
FIG. 9 depicts a flowchart of an example method according to some embodiments of the present disclosure.

FIG. 9 shows a flowchart of an example flowchart 900 according to some embodiments of the present disclosure. The flowchart 900 can be implemented at the video processing device 420 as shown in FIG. 4. For the purpose of discussion, the flowchart 900 will be described from the perspective of the video processing device 420 with reference to FIG. 4.

For a video segment which is to be rendered, at block 910, the video processing device 420 determines respective resolution levels for a plurality of objects presented in the video segment based on a relationship between a primary object and at least one remaining object of the plurality of objects. At block 920, the video processing device 420 determines, from the video segment, a plurality of object-based video elements at the determined respective resolution levels. Each of the plurality of object-based video elements is corresponding to one of the plurality of objects. At block 930, the video processing device 420 causes the plurality of object-based video elements to be delivered for rendering the video segment.

In some embodiments, the respective resolution levels for the plurality of objects are determined further based on at least one of a playback mode of the video segment or available network bandwidth.

In some embodiments, the respective resolution levels for the plurality of objects are determined by assigning a resolution level for the primary object and determining at least one resolution level for the at least one remaining object based on the assigned resolution level for the primary object and the relationship.

In some embodiments, the video processing device 420 further comprises a step of determining a loading order of the plurality of object-based video elements based on the resolution levels of the plurality of objects (not shown in FIG. 9). In some embodiments, the plurality of object-based video elements are caused to be delivered in the determined loading order.

In some embodiments, a plurality of candidate object-based video elements at different candidate resolution levels are generated and stored for a given object of the plurality of objects. In some embodiments, the plurality of object-based video elements are determined by selecting, from the plurality of candidate object-based video elements, an object-based video element at the resolution level determined for the given object.

In some embodiments, for a given object of the at least one remaining object, the relationship between the primary object and the given object is indicated by a measure of a relationship strength between the primary object and the given object. In some embodiments, the measure of a relationship strength between the primary object and the given object is determined based on at least one of the following: a first measure of a direct relationship strength between the primary object and the given object, or a second measure of an indirect relationship strength between the primary object and the given object, the primary object being indirectly correlated to the given object across at least one further object of the plurality of objects, and the second measure being determined based on measures of direct relationship strengths between the primary object and the at least one further object and between the at least one further object and the given object.

In some embodiments, the first measure of the direct relationship strength between the primary object and the given object is determined based on information related to at least one of the following: at least one distance between the primary object and the given object occurred in a frame of the video segment, respective positions of the primary object and the given object in at least one frame of the video segment, or a logical relationship between the primary object and the given object.

In some embodiments, the primary object is selected from the plurality of objects based on at least one of: respective occurrence durations of the plurality of objects in the video segment, respective occurrence frequencies of the plurality of objects in the video segment, a story line in the video segment, a logical relationship between the plurality of objects, a user focus on the plurality of objects, or a user preference.

In some embodiments, the video segment is comprised in a plurality of video segments divided from a video, and in some embodiments the video is divided into the plurality of video segments based on at least one of the following: at least one shot or at least one scene detected in the video, each of the plurality of video segments comprising at least one frame of the video.

It should be noted that the processing of object-based video loading or the video processing device 420 according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more processors, respective resolution levels for a plurality of objects, presented in a video segment to be rendered, based on a relationship between a primary object and at least one remaining object of the plurality of objects;
   determining, by one or more processors, from the video segment, a plurality of object-based video elements at the determined respective resolution levels, each of the plurality of object-based video elements corresponding to one of the plurality of objects;
   determining, by one or more processors, a loading order for the plurality of object-based video elements based on the respective resolution levels for the plurality of objects; and
   causing, by one or more processors, the plurality of object-based video elements to be delivered for rendering the video segment in the determined loading order.

2. The method of claim 1, wherein determining the respective resolution levels for the plurality of objects is further based on a selection from the group consisting of: a playback mode of the video segment and available network bandwidth.

3. The method of claim 1, wherein determining the respective resolution levels for the plurality of objects comprises:
   assigning, by one or more processors, a resolution level for the primary object; and
   determining, by one or more processors, at least one different resolution level for the at least one remaining object based on the assigned resolution level for the primary object and the relationship.

4. The method of claim 1, wherein:
   a plurality of candidate object-based video elements at different candidate resolution levels are generated and stored for a given object of the plurality of objects; and
   determining the plurality of object-based video elements comprises selecting, by one or more processors, from the plurality of candidate object-based video elements, an object-based video element at the resolution level determined for the given object.

5. The method of claim 1, wherein:
   for a given object of the at least one remaining object, the relationship between the primary object and the given object is indicated by a measure of a relationship strength between the primary object and the given object; and
   the measure of a relationship strength between the primary object and the given object is determined based on a selection from the group consisting of: (i) a first measure of a direct relationship strength between the primary object and the given object and (ii) a second measure of an indirect relationship strength between the primary object and the given object, the primary object being indirectly correlated to the given object across at least one further object of the plurality of objects, and the second measure being determined based on measures of direct relationship strengths between the primary object and the at least one further object and between the at least one further object and the given object.

6. The method of claim 5, wherein the first measure of the direct relationship strength between the primary object and the given object is determined based on information related to a selection from the group consisting of: a distance between the primary object and the given object in a frame of the video segment, respective positions of the primary object and the given object in a frame of the video segment, and a logical relationship between the primary object and the given object.

7. The method of claim 1, wherein the primary object is selected from the plurality of objects based on a selection from the group consisting of: respective occurrence durations of the plurality of objects in the video segment, respective occurrence frequencies of the plurality of objects in the video segment, a story line in the video segment, a logical relationship between the plurality of objects, a user focus on the plurality of objects, and a user preference.

8. The method of claim 1, wherein:
the video segment is comprised in a plurality of video segments divided from a video; and
the video is divided into the plurality of video segments based on a selection from the group consisting of: at least one shot and at least one scene detected in the video, each of the plurality of video segments comprising at least one frame of the video.

9. A computer program product comprising:
one or more computer readable storage media, and program instructions collectively stored on the one or more computer readable storage media, the program instructions comprising:
program instructions to determine respective resolution levels for a plurality of objects, presented in a video segment to be rendered, based on a relationship between a primary object and at least one remaining object of the plurality of objects;
program instructions to determine, from the video segment, a plurality of object-based video elements at the determined respective resolution levels, each of the plurality of object-based video elements corresponding to one of the plurality of objects;
program instructions to determine a loading order for the plurality of object-based video elements based on the respective resolution levels for the plurality of objects; and
program instructions to cause the plurality of object-based video elements to be delivered for rendering the video segment in the determined loading order.

10. The computer program product of claim 9, wherein program instructions to determine the respective resolution levels for the plurality of objects are further based on a selection from the group consisting of: a playback mode of the video segment and available network bandwidth.

11. The computer program product of claim 9, wherein program instructions to determine the respective resolution levels for the plurality of objects comprise:
program instructions to assign a resolution level for the primary object; and
program instructions to determine at least one different resolution level for the at least one remaining object based on the assigned resolution level for the primary object and the relationship.

12. The computer program product of claim 9, wherein:
a plurality of candidate object-based video elements at different candidate resolution levels are generated and stored for a given object of the plurality of objects; and
program instructions to determine the plurality of object-based video elements comprise program instructions to select from the plurality of candidate object-based video elements, an object-based video element at the resolution level determined for the given object.

13. The computer program product of claim 9, wherein:
for a given object of the at least one remaining object, the relationship between the primary object and the given object is indicated by a measure of a relationship strength between the primary object and the given object; and
the measure of a relationship strength between the primary object and the given object is determined based on a selection from the group consisting of: (i) a first measure of a direct relationship strength between the primary object and the given object and (ii) a second measure of an indirect relationship strength between the primary object and the given object, the primary object being indirectly correlated to the given object across at least one further object of the plurality of objects, and the second measure being determined based on measures of direct relationship strengths between the primary object and the at least one further object and between the at least one further object and the given object.

14. The computer program product of claim 13, wherein the first measure of the direct relationship strength between the primary object and the given object is determined based on information related to a selection from the group consisting of: a distance between the primary object and the given object in a frame of the video segment, respective positions of the primary object and the given object in a frame of the video segment, and a logical relationship between the primary object and the given object.

15. The computer program product of claim 9, wherein the primary object is selected from the plurality of objects based on a selection from the group consisting of: respective occurrence durations of the plurality of objects in the video segment, respective occurrence frequencies of the plurality of objects in the video segment, a story line in the video segment, a logical relationship between the plurality of objects, a user focus on the plurality of objects, and a user preference.

16. The computer program product of claim 9, wherein:
the video segment is comprised in a plurality of video segments divided from a video, and
the video is divided into the plurality of video segments based on a selection from the group consisting of: at least one shot and at least one scene detected in the video, each of the plurality of video segments comprising at least one frame of the video.

17. A computer system comprising:
one or more computer processors, one or more computer readable storage media, and program instructions collectively stored on the one or more computer readable storage media for execution by at least one of the one or more computer processors, the program instructions comprising:
program instructions to determine respective resolution levels for a plurality of objects, presented in a video segment to be rendered, based on a relationship between a primary object and at least one remaining object of the plurality of objects;
program instructions to determine, from the video segment, a plurality of object-based video elements at the determined respective resolution levels, each of the plurality of object-based video elements corresponding to one of the plurality of objects; and
program instructions to determine a loading order for the plurality of object-based video elements based on the respective resolution levels for the plurality of objects; and program instructions to cause the plurality of object-based video elements to be delivered for rendering the video segment in the determined loading order.

18. The computer system of claim 17, wherein program instructions to determine the respective resolution levels for the plurality of objects are further based on a selection from the group consisting of: a playback mode of the video segment and available network bandwidth.

\* \* \* \* \*